3,309,297
POLYMERIZATION OF VINYL ESTERS
Gozo Takayama, Takatsuki, Koichi Takakura, Hirakata, and Junji Ukida and Masakazu Matsumoto, Kurashiki, Japan, assignors to Kurashiki Rayon Co., Ltd., Kurashiki-shi, Japan, a corporation of Japan
No Drawing. Continuation of application Ser. No. 133,300, Aug. 23, 1961. This application July 29, 1965, Ser. No. 473,495
Claims priority, application Japan, Sept. 12, 1960, 35/37,651
2 Claims. (Cl. 204—159.23)

This application is a continuation of Serial No. 133,300, filed August 23, 1961.

The present invention is concerned with the polymerization of vinyl esters and is more particularly concerned with low temperature photo-polymerization of vinyl esters.

Azobis-nitrile compounds have been proposed as initiators for the polymerization of vinyl compounds and Hunt U.S. Patent No. 2,471,959 describes such operation in detail. Furthermore, it has been made clear that the rate of thermal decomposition varies greatly in relation to the structure of azobis-compounds, and the rate of production of free radicals by such thermal decomposition governs the rate of polymerization of vinyl compounds. For example, Overberger et al. (J. Am. Chem. Soc. 71, 2661 (1949) state that the thermal decomposition rate constants ($\times 10^{-4} \cdot \text{sec.}^{-1}$) for azobis-nitrile compounds in toluene at 80.2° C. are: 1.72–1.60 for azobis-isobutyronitrile; 7.1 for 2,2'-azobis (2,4 dimethylvaleronitrile); and 0.083 for 2,2'-azobis-cyclohexane-carbonitrile. This suggests that the rate of decomposition is governed by steric factors presented by the alkyl groups in the molecule.

The thermal decomposition of these azobis-compounds is induced by the accumulation of the heat of polymerization and as they decompose polymerization is accelerated. As a result, difficulty is experienced in carrying out polymerization under constant, reproducible conditions and there is always the danger of the creation of explosive polymerization conditions.

It is an object of the present invention to provide a process for polymerizing vinyl esters which avoids the foregoing drawbacks and disadvantages.

It is a further object of the invention to provide a process of the character indicated which can be effectively carried out at low temperatures.

In accordance with the present invention, vinyl esters are polymerized by the action of light, e.g. visible light or ultra-violet light, in the presence of polymerization sensitizers or initiators which are azobis-amides having the formula

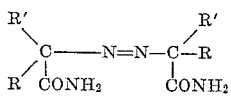

wherein R and R' are alkyl groups, particularly lower alkyl groups, i.e. containing up to six carbon atoms. Polymerization is effected in the presence of organic solvents, with or without the concurrent presence of water.

A feature of this process is that it is highly efficient even at low temperature and uncontrolled polymerization accompanying the thermal decomposition of azobis-compounds of the type heretofore used is inhibited. Consequently, polymerization can be effected on an industrial scale safely and smoothly.

It is a further feature of the invention that polyvinyl alcohols derived from the polyvinyl esters produced by the process of this invention have improved crystallinity.

The rate of thermal decomposition of 2,2'-azobis-isobutyramide, which is representative of the compounds used in accordance with the process of this invention, in methanol at 80° C., for example, is shown in Table 1 and is very small when compared with that of dimethyl-2,2'-azobisisobutyrate, measured under identical conditions. The rate of thermal decomposition of dimethyl-2,2'-azobisisobutyrate is considered to be on the same level as that of 2,2'-azobisisobutyronitrile.

TABLE 1.—RATE OF THERMAL DECOMPOSITION PERCENT AT 80° C., IN METHANOL

| Time of decomposition (hrs.) | 2, 2'-azobisisobutyramide | Dimethyl-2, 2'-azobisisobutyrate |
|---|---|---|
| 0 | 0 | 0 |
| 2 | 5.0 | 72.4 |
| 4 | 12.0 | 93.2 |
| 8 | 21.0 | [1] 100 |

[1] Approximately.

From Table 1 it is seen that the thermal decomposition of 2,2'-azobisbutyramide is a very small fraction in comparison with conventional azobis-compounds. This is of significant importance from the standpoint of safe practice in the low temperature photo-sensitized polymerization. As previously mentioned, in low temperature polymerization carried out on an industrial scale, thermal decomposition of azo-compounds is induced by the accumulation of the heat of polymerization, and the polymerization is accelerated. As one result, there arises the possibility of difficulties in polymerizing under constant conditions and there is the danger of inducing explosive polymerizations. In contrast, with 2,2'-azobisisobutyramide, which is very slow in undergoing any thermal decomposition as shown in Table 1, such problems are completely eliminated, and the control of low temperature polymerization is greatly facilitated.

It is well known that azobis-nitrile compounds and azobis-ester compounds may be used as sensitizers for the photo polymerization of vinyl esters, but the use of azobis-amide compounds of the character set forth above as sensitizers for the photo-polymerization of vinyl esters has not heretofore been proposed. With the addition of azobis-amide compounds to a solution of a vinyl ester in organic solvents, with or without the concurrent presence of water, the azobis-amide compounds, especially 2,2'-azobis-isobutyramide, being substantially insoluble in vinyl esters, photo polymerization of the vinyl esters can be readily carried out under actinic irradiation, e.g. with ultra-violet light or visible light, at room temperature or below. We have found that the rate of polymerization is very high, compared with that in which well-known photo-sensitizers, e.g., 2,2'-azobis-isozutyronitrile or 2,2'-azobis-(2,4-dimethylvaleronitrile) are used, and this is especially so at temperatures below —20° C. In contrast with the weak and impractical sensitizing effect of 2,2'-azobis-isobutyronitrile, the azobis-amide compounds of this invention insure beneficial rates of polymerization even on an industrial scale. The maximum absorption of ultra-violet light in the case of azobis-nitrile compounds, e.g., 2,2'-azobis-isobutyronitrile, is at a wave length of 3450 A., whereas that of azobis-amide compounds, e.g., 2,2'-azobis-isobutyramide, is 3710 A., the maximum absorption range being shifted to the longer wave length side. The molecular absorption coefficient at maximum absorption is twice as large with azobis-amide compounds as with the other azobis-compounds mentioned. Furthermore, the rate of photo-decomposition measured by the irradiation from a 100-watt ultra-high pressure mercury lamp is found to be higher with azobis-amide compounds than with the other azobis-compounds in its sensitizing action on the photo-polymerization of vinyl esters.

Furthermore, not only high rate of polymerization due to the high rate of photo-decomposition of azobis-amide compounds, but also the superior polymerization initiating ability of these compounds, as revealed by the greater amount of vinyl esters polymerized on the basis of identical photo-decomposition conditions in comparison with azobis-nitrile compounds, have been confirmed. On the other hand, no variation in the polymer yield under identical photo-decomposition conditions, using various azobis-compounds was observed when styrene, instead of vinyl esters, was polymerized. Whether the sensitizer was an azobis-amide compound or an azobis-nitrile compound, the results were almost identical. In other words, the unique photo-sensitizing action of azobis-amide compounds is exhibited only when they are used in the polymerization of vinyl esters. This is one of the important and surprising features of this invention.

Examples of azobis-amide compounds corresponding to the structural formula set forth above and suitable for the photo-polymerization of vinyl esters in accordance with this invention, include those in which R is a methyl group, and R' is a methyl, ethyl, propyl or isobutyl group. The temperature of photo-polymerization in accordance with this invention may range from −40° C. or below to 100° C., but preferably is −30° C. to 30° C.

The concentration of the azobis-amide compounds used in the polymerization system is at 0.001–5%, the optimum concentration being dependent upon the temperature of polymerization and the light intensity.

As the light source, any convenient source of actinic radiation may be employed, and particularly suitable are ultra-high pressure and high pressure mercury lamps or fluorescent lamps, tungsten lamps, and even sun light, an especially suitable radiation being in the range of 3000–4500 A. wave length.

As the solvent for the monomer in the polymerization reaction, any of the solvents used in solvent polymerization of vinyl esters may be used, but particularly suitable are alcohols, such as methanol, ethanol, and other lower-alkyl alkanols, fatty acids, such as acetic acid, n-butyric acid, and other lower-alkyl aliphatic acids, ketones, such as acetone, and fatty acid esters such as methyl formate, methyl acetate, and other lower-alkyl esters of lower-alkyl fatty acids. Furthermore, mixtures of these solvents may be used and the solvents may be anhydrous or mixed with water. Preferably, methanol and acetic acid are used and with methanol and acetic acid containing water, the rate of polymerization and the degree of polymerization are both higher than those with the same solvents but without water. The amount of water may vary but is generally up to about 10%.

The present invention is applicable to the polymerization of vinyl esters in general. Thus, the method is applicable not only to the commonly used vinyl acetate, but also to other esters of vinyl alcohol. Suitable esters are those represented by the formula $CH_2=CHOCOR$ in which R is an alkyl radical, e.g. a lower alkyl group such as an alkyl group containing 1 to 6 carbon atoms. Thus, vinyl esters which can be polymerized in accordance with this invention include vinyl formate, vinyl acetate, vinyl propionate, vinyl butyrate, vinyl stearate, and the like. In an especially preferred embodiment of the present invention, vinyl acetate is polymerized.

The amount of solvent used in the polymerization can vary over a wide range. Generally the use of the solvent in amounts of about 15 to 85 parts per 100 parts by weight of the combined monomer and solvent, and preferably 20 to 70 parts, is suitable.

The degree of polymerization of the polyvinyl esters can be readily controlled in conventional manner by varying the quantity of solvent used. Thus, a polymer having any desired degree of polymerization can easily be obtained.

Pressure does not appear to be a parameter of this reaction, and the reaction, therefore, is preferably conducted at atmospheric pressure. Polymerization times of the order of several minutes, for example, fifteen minutes to a week or so can be used.

The resulting polyvinyl ester may be recovered and converted to polyvinyl alcohol according to conventional procedures. Polyvinyl alcohol is a polymer containing hydroxyl groups and corresponding to the formula:

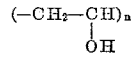

wherein $n$ is an integral which can vary within wide limits, as is well-known in the art. Polyvinyl alcohol can be produced from the corresponding polyvinyl ester, e.g. polyvinyl acetate, by alkaline or acid saponification or alcoholysis, in accordance with the following equation:

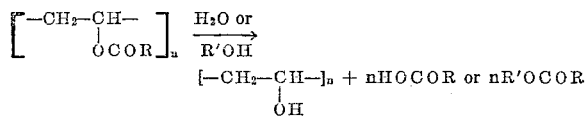

With respect to known saponification processes and techniques, reference is suitably made, for example, to Bristol U.S. Patent 2,700,035, Waugh et al. U.S. Patent 2,642,419 and Germain U.S. Patent 2,643,994.

A feature of the present invention is that the crystallinity of polyvinyl alcohol derived from polyvinyl esters produced by the method described is high in comparison with polyvinyl alcohol derived from polyvinyl esters produced by conventional polymerization procedures.

It is another feature of the invention that the azobis-amide compounds used in the polymerization system can be removed with ease, with alcohol, at the time of the saponification reaction. One of the important advantages of the saponification of polyvinyl esters obtainable by the polymerization process of this invention is that the polyvinyl alcohols produced from them are resistant to discoloration by contact with acids or alkalis, or by heat treatment. When conventional sensitizers for photo-polymerization, of vinyl esters, e.g., benzoin, bromacetophenone, or uranyl salts, are used, carbonyl groups are found at the molecular ends of the resulting polyvinyl alcohols, and the ultra-violet absorption spectra show characteristic absorption bands due to those carbonyl groups. The polyvinyl alcohols thus produced are readily discolored upon contact with alkalies and by exposure to heat. These factors are serious drawbacks in the industrial application of conventional photo-sensitizers in the production of polyvinyl esters and that such discoloration is avoided in the case of polyvinyl alcohols derived from the polymerization products of this invention, is of substantial industrial importance.

The nature and features of the invention will be further apparent from the following specific examples of practical application. However, it will be understood that these examples are not to be construed as limiting the scope of the present invention in any manner. In the examples, all parts are by weight unless otherwise indicated.

*Example 1*

2,2'-azobisisobutyramide was added to a solution consisting of 50% vinyl acetate and 50% methanol in a hard glass test tube in the amount of $3 \times 10^{-3}$ mol/l., the air was replaced by nitrogen, and the tube was sealed. This tube with its contents was immersed in a methanol-solid carbon dioxide bath held at −20° C., and was irradiated with ultra-violet light (>3000 A.) from an ultra-high pressure mercury lamp (Matsuda SHL 100 UV) at a distance of 15 cm. Polymerization commenced immediately without exhibiting any induction period. The conversion after 3 hours of irradiation was found to be 14.7% and the degree of polymerization of the polymer was 1620.

By following the same procedure but by increasing the concentration of 2,2'-azoisobutyramide, the rate of polymerization was increased. For example, when the sensitizer was added in the amount of $1.2 \times 10^{-2}$ mol/l., about 30% was polymerized after three hours. When no sensitizer was added, polymerization was not observed upon ultra-violet irradiation.

Example 2

2,2'-azobisisobutyramide was added in a concentration of $3 \times 10^{-3}$ mol/l. to a solution comprising 50% vinyl acetate, 30% methanol, 15% acetic acid, and 5% water. Photo-polymerization was carried out as described in Example 1. In this instance, 18.3% was polymerized after three hours at —20° C., and the degree of polymerization of the product polyvinyl acetate was 2520.

Example 3

To three samples of a solution composed of 50% vinyl acetate and 50% methanol, there were added 2,2'-azobis-isobutramide, 2,2'-azobis-isobutyronitrile and 2,2'-azobis-(2,4-dimethyl valeronitrile), respectively, each in a concentration of $3 \times 10^{-3}$ mol/l. When these samples were polymerized by light as in Example 1, at —20° C. for 3 hours conversions of 15.8%, 3.0% and 1.8%, respectively, were obtained.

The conditions and relative relationships set forth above are those preferred in carrying out the process of the invention but it will be understood that other conditions and relationships may be used within the scope of the invention. Thus, while polymerization is preferably carried out in accordance with this invention in an inert atmosphere, e.g. in an atmosphere of nitrogen, polymerization may also be effected in the presence of oxygen, e.g. in the presence of air.

It will also be understood that, unless otherwise indicated, conventional polymerization techniques used in the polymerization of vinyl esters are employed in carrying out the polymerization process of the present invention and that conventional polymerization equipment suited to the conditions of polymerization is employed.

It will thus be understood that various changes and modifications may be made without departing from the scope of the invention as defined in the appended claims and it is intended, therefore, that all matter contained in the foregoing description shall be interpreted as illustrative only and not as limitative of the invention.

We claim:

1. A method of polymerizing a vinyl ester which comprises subjecting said ester to photo-polymerization in the presence of an organic solvent therefor and in the presence of 2,2'-azobisbutyramide, said solvent being methanol or acetic acid, said photo-polymerization being effected at a temperature from —30° C. to 30° C. with radiation having a wave length of 3000–4500 A., and said azobis-amide being present in the polymerization system in the amount of 0.001 to 5%, said solvent being admixed with 5–10% of water and said solvent being present in the amount of about 15 to 85 parts per hundred parts by weight of the combined vinyl ester and solvent.

2. A method of polymerizing vinyl acetate which comprises subjecting said vinyl acetate to photo-polymerization in the presence of an organic solvent therefor and in the presence of 2,2'-azobisbutyramide, said solvent being methanol or acetic acid, said photo-polymerization being effected at a temperature from —30° C. to 30° C. with radiation having a wave length of 3000–4500 A., and said azobis-amide being present in the polymerization system in the amount of 0.001 to 5%, said solvent being admixed with 5–10% of water and said solvent being present in the amount of about 15 to 85 parts per hundred parts by weight of the combined vinyl acetate and solvent.

References Cited by the Examiner

UNITED STATES PATENTS

| | | | |
|---|---|---|---|
| 2,471,959 | 5/1949 | Hunt | 260—89.5 |
| 2,657,192 | 10/1953 | Miller et al. | 260—67 |
| 2,996,381 | 8/1961 | Oster et al. | 204—158 |

MURRAY TILLMAN, *Primary Examiner.*

N. F. OBLON, *Assistant Examiner.*